US012566333B2

(12) United States Patent
Madden et al.

(10) Patent No.: US 12,566,333 B2
(45) Date of Patent: Mar. 3, 2026

(54) HINGING CARRIER FOR HEAD-MOUNTED DEVICE

(71) Applicant: IRISTICK NV, Sint-Martens-Latem (BE)

(72) Inventors: Philip Madden, Sint-Martens-Latem (BE); Vianney Le Clément De Saint-Marcq, Sint-Martens-Latem (BE); Jasper Van Bourgognie, Sint-Martens-Latem (BE); Riemer Grootjans, Sint-Martens-Latem (BE); Peter Verstraeten, Sint-Martens-Latem (BE)

(73) Assignee: IRISTICK NV, Sint-Martens-Latem (BE)

( * ) Notice: Subject to any disclaimer, the term of this patent is extended or adjusted under 35 U.S.C. 154(b) by 331 days.

(21) Appl. No.: 18/258,260

(22) PCT Filed: Dec. 17, 2021

(86) PCT No.: PCT/EP2021/086600
§ 371 (c)(1),
(2) Date: Jun. 19, 2023

(87) PCT Pub. No.: WO2022/129576
PCT Pub. Date: Jun. 23, 2022

(65) Prior Publication Data
US 2024/0036334 A1 Feb. 1, 2024

(30) Foreign Application Priority Data
Dec. 18, 2020 (EP) ..................................... 20215608

(51) Int. Cl.
*G02B 27/01* (2006.01)
*F16M 11/14* (2006.01)
*F16M 13/04* (2006.01)

(52) U.S. Cl.
CPC ......... *G02B 27/0176* (2013.01); *F16M 11/14* (2013.01); *F16M 13/04* (2013.01); *G02B 27/017* (2013.01)

(58) Field of Classification Search
CPC .................................................. G02B 27/0176
See application file for complete search history.

(56) References Cited

U.S. PATENT DOCUMENTS

2015/0378160 A1* 12/2015 Lee .................... G02B 27/0172
345/8
2018/0011326 A1* 1/2018 Ishizaki ............. G02B 27/0172

FOREIGN PATENT DOCUMENTS

EP      3580602 A1    12/2019
WO      0010156 A1    2/2000

OTHER PUBLICATIONS

International Search Report and Written Opinion from corresponding PCT application PCT/EP2021/086600 mailed Feb. 4, 2022.

* cited by examiner

*Primary Examiner* — Joseph P Martinez
(74) *Attorney, Agent, or Firm* — Vorys, Sater, Seymour and Pease LLP

(57) ABSTRACT

The current invention relates to an improved hinge system in a head-mounted device for allowing movement of a carrier supporting an electronic device.

18 Claims, 3 Drawing Sheets

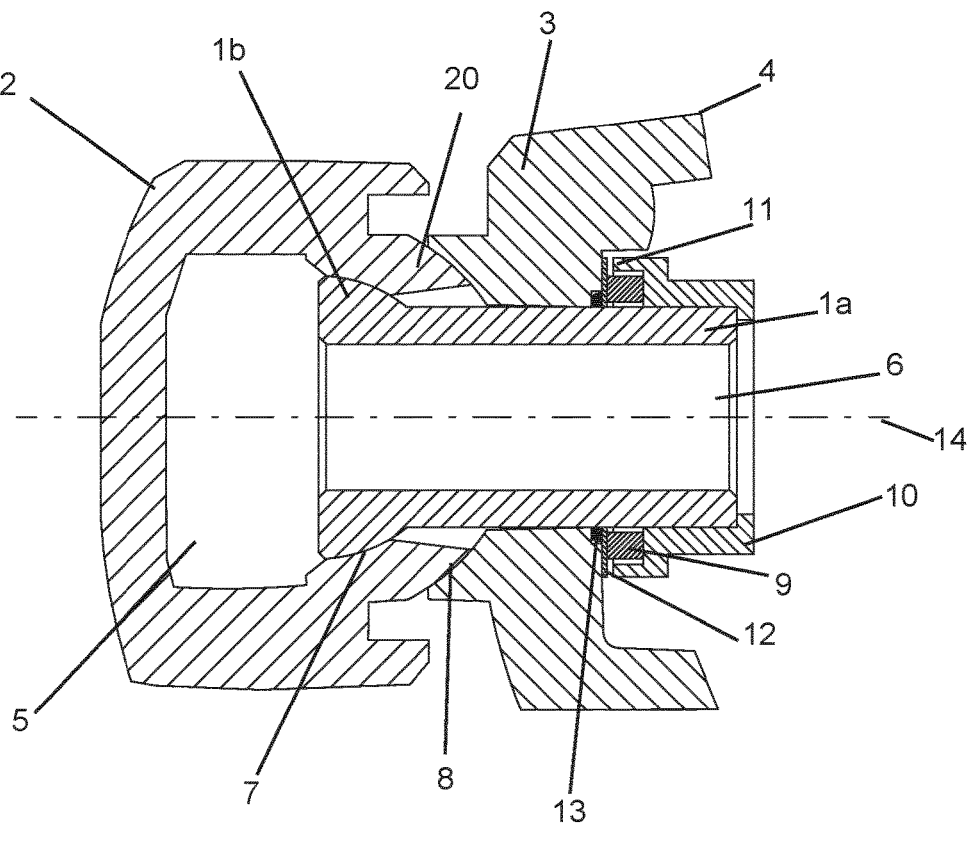
Fig. 1A
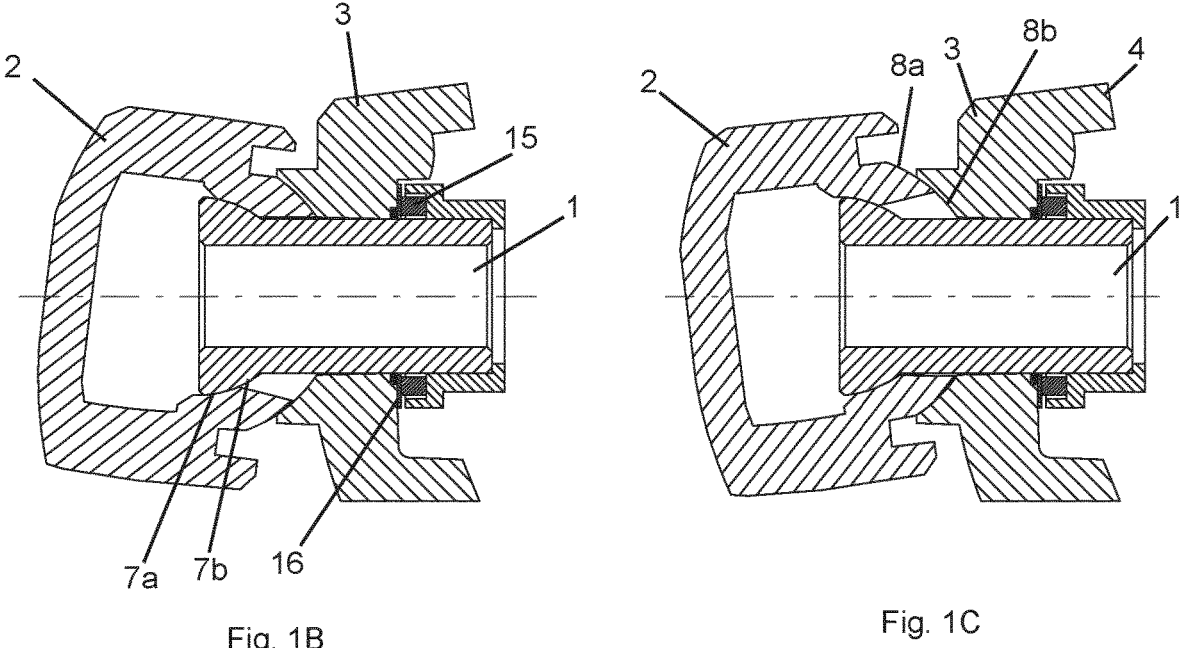
Fig. 1B
Fig. 1C

HINGING CARRIER FOR HEAD-MOUNTED DEVICE

FIELD OF THE INVENTION

The present invention relates to a hinge system for use in the field of electronic head-mounted devices with movable electronic subsystems, said electronic system preferably a display.

BACKGROUND

As wearable devices or HMDs (head-mounted devices) become more and more integrated in the workplace as well as in free time activities, there is an increased need in versatility, and especially an increased need in improved user-friendliness, coupled with a mechanical reliability. In what follows, specific emphasis will be given towards the implementation with displays as the electronic subsystems, but it can be understood that the invention is equally applicable to other electronic subsystems, such as image sensors, zoom cameras, speakers, and others. As such, throughout the application, the term "display" is to be considered as a specific example of the electronic subsystems to which the invention applies.

For HMDs, it is desirable that the electronic subsystem is provided in a movable fashion, especially with display systems, so that it can be moved in front of a user's eyes, but can also be removed therefrom so that it doesn't obscure their vision, or to simply put it in another visible position that better suits a particular situation. This movable connection between electronic subsystem and the frame itself is usually via one or more hinged connections. It is crucial that the current systems allow for movement in multiple planes, thereby rising above the age-old hinge systems that enable rotation around a single axis.

It is therefore to be considered that these hinged connections need an electronic subsystem that is electrically connected to the frame in order to receive both power and data input. Therefore, the hinged connection needs to be adapted to allow wiring to extend therethrough. It is clear to the skilled person that such hinged connections systems are a weak element in the system as they are the mechanical component, are moved and manipulated often, while still requiring wiring to functionally extend all the way to the electronic subsystem itself. While in old systems, with a single (rotational) degree of freedom, this could be accomplished, the present systems require a more complex solution.

Furthermore, it should be noted that the movement in multiple planes needs to be nuanced. While rotation around the longitudinal axis will usually stay the 'main' movement, other types of movements will still need to be allowed in all situations. However, these other types of movements are usually disruptive towards 'preferred' positions, for instance with displays, where the standard position where the display is positioned in the most lateral corner of the user's field of vision (depending at which eye the display is worn). Moving the display higher or lower can be easily accomplished, and requires very little from the user in terms of quick calibrations, and can be done based on intuition and vision alone. Positioning the display at a correct lateral position however is more complex, as there is less margin for error. Moving the display too far outwardly will create a situation where part of the display is outside of the usual field of view, requiring the user to strain their eyes to view the full display. Moving the display too far inwardly blocks a section of the field of view, which is highly undesirable. This is especially inconvenient in case the display is worn in landscape mode, as this way the display extends deep into the field of view. Often, this lateral position is determined through extensive use, and multiple adjustments. However, if the user then needs to move the display in a certain situation, all these calibrations are for naught and need to be redone. Most importantly however, during movement of the display module by rotation around the longitudinal axis, the hinged connection tends to also rotate in other directions, requiring the display position to be adjusted laterally whenever the display is rotated around the longitudinal axis.

The industry requires a hinged connection system which allows for an easy and intuitive handling of the display, to easily reach the correct position.

Similar advantages apply to other types of electronic subsystems, such as speakers, cameras and others, wherein repositioning and reorientation often is delicate, and the need exists to control this to a high degree.

An example of a prior art electronic eyewear viewing device is found in US2016/274357, wherein a terminal device is presented which is wearable on the eyes of a user's in a stable manner. A band frame is provided to be worn on a user's head. In a housing located in one end of the frame a control unit is provided. In a second housing located in the other end of the frame a battery is mounted. A third housing is coupled to a lateral surface of the frame contains another control unit. A front housing is coupled to this third housing by a hinge. A transparent display coupled to the front housing is to be located in front of one of the user's eyes.

Another example is given in US2016/216519, relating to a wearable display device employing a sliding structure. The device includes: a frame, a main unit coupled to the frame, a non-bending part, which includes a camera configured to capture an image of a forward direction and which is coupled to the main unit and is configured to slide to a first position, a hinge coupled with the non-bending part, and a bending part, which is configured to provide image information to a user, and which is coupled with the hinge to rotate within a predefined angle. When the bending part is rotated, the camera is exposed to the exterior and moves from the first position to a second position.

There is a strong need for an improved hinged connection system that allows a secure electric connection to extend therethrough, while allowing movement around a number of axis (not solely rotation around a longitudinal axis) without compromising long-term operability.

SUMMARY OF THE INVENTION

The present invention and embodiments thereof serve to provide a solution to one or more of above-mentioned disadvantages. To this end, the present invention relates to a head-mounted device (HMD), preferably head-mounted display devices, comprising:
- a. a frame arranged to be wearable on a user's head, said frame comprising one or more electronic components;
- b. a module comprising an electronic subsystem;
- c. a carrier for supporting the module, said carrier being freely rotatably connected to the frame via a first hinged connection system;
- d. electrical wiring connecting the electronic subsystem to the one or more electronic components;

wherein the first hinged connection system comprises at the frame of the HMD a joint with an elongate axial section and a ball section with a larger diameter than the axial section, wherein the axial section transitions into the ball section along a first direction of the axial section, wherein the ball section comprises an at least partially spherical portion, preferably a spherical segment, a sphere or a spherical cap. The first hinged connection system further comprises a housing at the frame, said housing comprising an elongate, hollow channel, in which hollow channel at least part of the axial section of the joint is rotatably housed.

The first hinged connection system further comprises at the carrier a socket with an interior cavity and an opening extending from the interior cavity to the outside of the socket.

The ball section of the joint is held in the interior cavity of the socket with the axial section extending out of the socket through the opening, whereby the opening has a larger radius than the axial section, thereby allowing a, limited, relative rotation between the ball section and the socket around at least one axis, and preferably all axes, in a plane perpendicular to the axial section. The socket is positioned at least partially between and in contact (preferably directly, but alternatively with an intermediary component interfacing between the two) with the at least partially spherical portion of the ball section and the housing.

The joint comprises a, preferably substantially straight, hollow wiring channel extending along the length of the axial section and extending via the ball section into the cavity of the socket, whereby the electrical wiring extends from the electronic components through the wiring channel into the cavity and to the electronic subsystem.

The hinged connection system comprises, preferably at or in the frame, one or more biasing elements, which are most preferably positioned between the frame and the joint, for exerting a biasing force on, preferably the axial section of, the joint, said biasing force extending away from the carrier along the longitudinal axis of the axial section, thereby biasing the ball section of the joint against the socket whereby rotation of the carrier around the longitudinal axis of the joint generates a corresponding rotation of the joint along said longitudinal axis.

In a preferred embodiment, the HMD is adapted according to any one of the claims 2 to 15.

DESCRIPTION OF FIGURES

FIGS. 1A-C show a cross-sectional view of the hinged connection system of the HMD of an embodiment of the present invention.

DETAILED DESCRIPTION OF THE INVENTION

Figure 2:
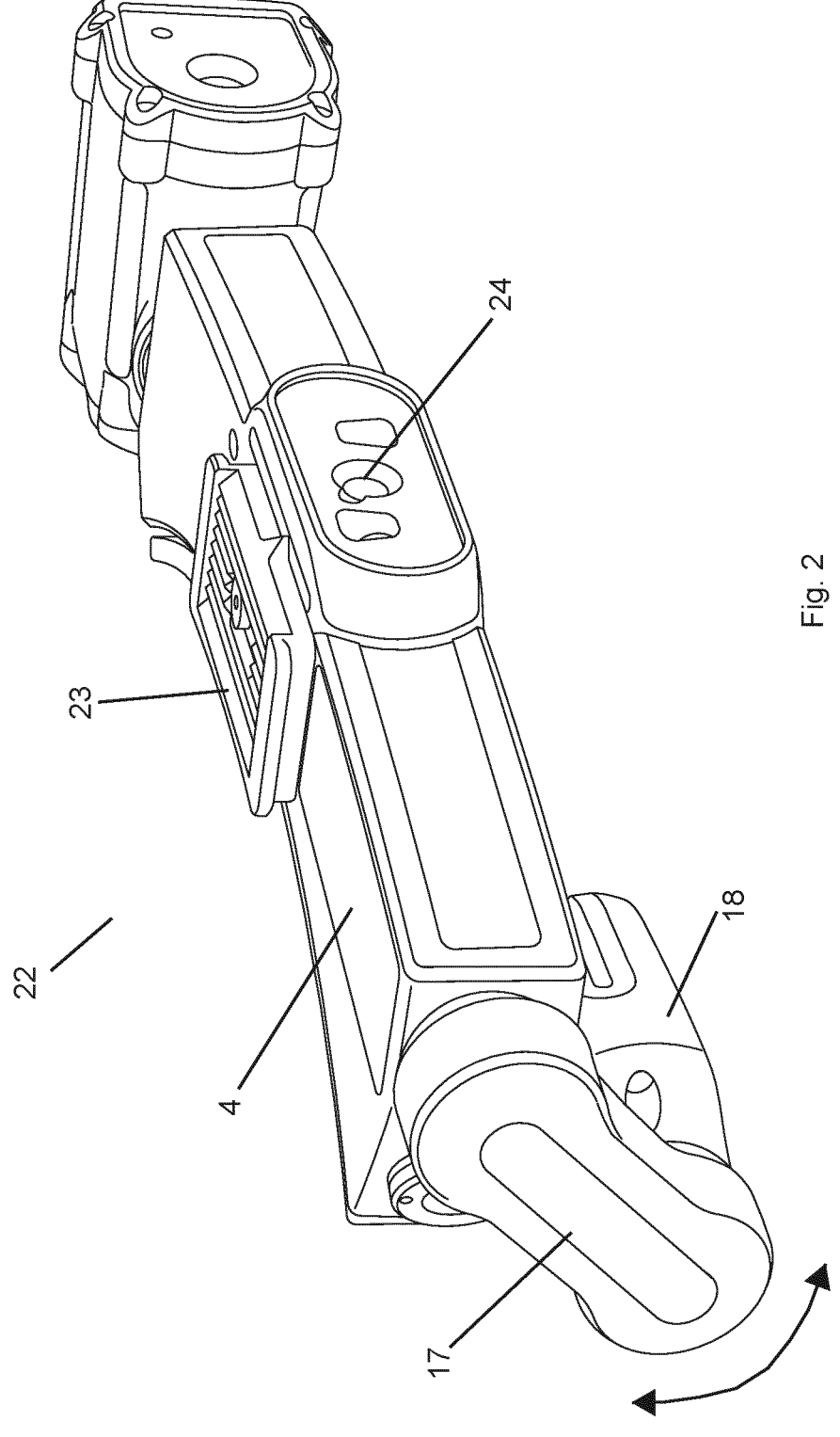
FIG. 2 shows a perspective view of the HMD according to an embodiment of the present invention, showcasing a first possible movement direction.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +1-10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

"Spherical segment" is the solid defined by cutting a sphere or a ball with a pair of substantially parallel planes. However, variations may be comprised wherein the pair of planes is not parallel but are angled with respect to each other under a maximal angle of about 30°, preferably 20°.

"Spherical zone" is the mantle of a spherical segment, or the surface of the spherical segment excluding the flat bases formed by the intersection of the sphere and the planes defining the spherical segment.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any≥6 or ≥7 or etc. of said members, and up to all said members.

The term "electronic subsystem" refers to an electronic component with a dedicated purpose. Preferably, it is a display, such as a microdisplay, or a camera or other image sensor.

The "module" is preferably a display module, supporting a display. Likewise, the carrier is preferably a display carrier, carrying the display module, and the display therein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The invention relates to a HMD with hinged connection system according to claim 1. In particular, the HMD is a head-mounted display module, where the electronic subsystem is a display or an image sensor (such as a zoom camera). Preferably, it is a display. As previously stated, the present invention is focused on providing a highly flexible hinged connection system, allowing a module to be moved between a wide range of positions, while ensuring a reliable mechanical and electrical connection between electronic subsystem and frame. The adaptations allow for the carrier to rotate freely along a longitudinal axis extending through the frame, operating in a general ball joint fashion. The ball joint has a central hollow wiring channel that allows wiring to pass into the socket holding the ball joint. The socket is kept in position or biased between the housing of the frame and the ball section of the joint due to a retracting or biasing force that is exerted on the joint with respect to the housing, creating a situation where the ball section exerts sufficient force on the socket to keep it in place, while still allowing relative rotation—both around the longitudinal axis and axes perpendicular thereto—between the socket on the one hand and the ball section and the housing on the other hand.

Via the above configuration and use of biasing force, the rotation of the socket is accomplished more easily around the longitudinal axis (i.e., with less force being applied to overcome biasing forces on the socket) than a rotation around an axis perpendicular thereto. During longitudinal rotation (around the longitudinal axis), the joint rotates along with the socket, and is held in a substantially friction-less fashion in the housing. As such, the only friction during said rotation is between the socket's exterior surface and the housing where these two contact each other. However, when the socket is rolled or rotated around an axis perpendicular to the longitudinal axis, the joint does not rotate along with the socket, as it is unable to do so due to the axial section, and creates an additional friction surface other than the contacting surface between the socket and the housing. By increasing the total surface over which friction occurs during the rotation, rotation around these perpendicular axes is made more difficult and the user will be less prone to accidentally adjust the lateral position of the electronic subsystem during manipulation thereof.

As mentioned before, most of the movements a user enacts on a carrier is shifting it up and down (between a visible position and an invisible position where it's out of the way). By increasing the frictional resistance on rotation around another axis, the present solution effectively prevents or strongly reduces unwanted adjustments in this sense.

Reducing friction between the axial section of the joint and the hollow channel of the housing can be accomplished via one or more of a number of techniques, among which a smooth finishing of both the interior of the hollow channel and the mantle of the axial section, proper choice of materials to reduce friction (low coefficient of friction, and particularly low static friction), use of bearings (rolling-element bearing, fluid bearing, etc.). While some friction will unavoidably occur (for instance due to the biasing of the joint by the frame), this can be minimized by one or more of the preceding techniques. Especially a proper choice of material interface around the biasing elements is advantageous, as at this position, additional friction may occur.

However, a material interface between the axial section (or additional element mounted thereon upon which the biasing elements contact) and the biasing elements; or between the interface between the biasing elements and the housing; or between an intermediary interface (washer and biasing elements) can be used to reduce this friction, which results in the relative rotation between housing and joint to take place at this low-friction interface. In a specific embodiment, the materials at said interface are both metal, preferably steel or aluminum, or alloys thereof. Of course, alternatives may be used.

In a more specific embodiment, the surface of the joint contacting the biasing elements and the surface of the biasing elements (and preferably the biasing elements entirely) comprises metal, preferably aluminum or steel. Note that in case of an intermediary element between biasing element and the joint, said intermediary element comprises metal (preferably aluminum or steel) to interface with the biasing elements with as little friction as possible.

In an alternative embodiment, between the biasing elements and the housing an additional element is provided, such as a washer; in such a case, the biasing elements and the additional elements comprise metal (preferably aluminum or steel) at their contacting surfaces or interface.

It should be noted that by employing multiple subsequent frictionless (or friction-reduced) interfaces between the housing and the joint at the biasing element connection between the two, the friction is even further reduced.

Further adjustments can be made to favor one type of movement versus another, such as grooves, ridges or other patterns in one or both contacting surfaces. For instance, by providing matching groove(s) and ridge(s), the rotation around the longitudinal axis can be made easier while providing more resistance to rotation around another axis.

On the other hand, the interface between housing and socket typically has synthetic compounds (plastics, polymers) contacting each other (or in some case synthetic-to-metal, such as between the socket and the ball section), resulting in a much higher friction than the metal-to-metal connection around the biasing elements.

None of the prior art systems provide for a mechanism that creates a difference in manipulation ease depending on the direction of rotation, as these are generally simple ball joint connections, in which the ball rolls in the socket under a force independent of the rotation direction.

The hinged connection system allows rotation around at least one axis in the plane perpendicular to the axial section, and preferably around all axes in said plane. This can be achieved by an asymmetric dimensioning of the opening of the socket, with a radius that does not exceed the radius of the axial section of the joint over its entire circumference. This way, it can be adapted to only allow rotation around a single axis, by having the opening's radius only exceed the radius of the axial section along a single dimension (allowing rotation around the axis perpendicular to said single dimension and perpendicular to the axial section). Preferably however, rotation around all axes is possible.

In a preferred embodiment, the housing and socket substantially comprise (or even consist of) plastic, such as polyamides, such as PA6, PA12 or others. This results in a sturdy product, with some flexibility, and sufficient friction in plastic-to-plastic interfaces to give preference to metal-to-metal interfaces.

Likewise, preferably the joint (or at least the axial section) comprises (or even consists of) metal, such as aluminum or steel.

In a preferred embodiment, the socket comprises an annular section around the opening, wherein said annular section comprises an interior surface section inside of the cavity facing partially in the first direction. This interior surface section corresponds to (at least part of) the mantle of the at least partially spherical portion of the ball section. The annular section comprises an exterior surface section facing partially in a second direction opposite to the first direction, said exterior surface section defining a mantle of a spherical segment. The housing comprises one or more brace sections with an aggregated surface at least partially matching the exterior surface section, wherein the socket is positioned at least partially between and in contact with the at least partially spherical portion of the ball section and the brace sections. The ball section finally biases the socket against the brace sections via the biasing force.

In this further embodiment, the socket is effectively clamped between ball section and housing, which both comprise curved surfaces that match the curved surface of the socket, thus allowing the relative rotation (up to a certain limit). This way, the socket cannot move along the longitudinal direction, being held in place between ball section and housing, but can still rotate.

Preferably, the brace sections form at least 300° of a spherical segment mantle or spherical zone, preferably at least 330°, and most preferably up to 360°.

In a further preferred embodiment, the brace sections define a surface of a first sphere, and the exterior surface section defines a surface of a second sphere, said first and second sphere essentially overlapping. Using sphere surfaces ensures that the relative rotation of the socket with respect to the joint and housing can be performed both along the longitudinal axis as well as perpendicular thereto.

In a preferred embodiment, the annular section of the socket extends from the cavity, defining an elongate continuation of the opening, said continuation being essentially frustoconical, wherein the radius of the frustoconical continuation increases away from the cavity. The frustoconical continuation allows the rotation of the socket around the axes perpendicular to the longitudinal axes. As can be seen in the Figures, the axial section of the joint will inevitably limit the angle of these rotations at a certain point, which ensures that the wiring cannot be brought into possible harmful positions, or can be damaged by a rotation past a certain degree. This limit is defined by the aperture or angle of the frustoconical continuation.

Preferably, the aperture of the frustoconical continuation (i.e. the aperture of the cone) is at most 30°, more preferably at most 25°, even more preferably at most 20°, or even 18°, 16°, 15° or less.

Preferably, the aperture is at least 5°, more preferably at least 8°, even more preferably at least 10°, 11°, 12° or more.

In a preferred embodiment, one of the exterior surface section or the brace sections comprises one or more partially annular indentations extending around part of the circumference of the exterior surface section or the brace sections, and wherein the other of the exterior surface section or the brace sections comprises one or more protrusions extending into said partially annular indentations, thereby defining a limit to the axial rotation of the socket with respect to the housing in both directions. The indentation does not form a full circumferential groove in the annular sections where the housing and socket contact, but has 'breaks' in which no groove, or a more shallow groove, is present, which block the passage of the protrusion on the other element. The indentation may comprise two separate, typically symmetrical sections, each defining almost half of the circumference, with two protrusions being present on the counterpart, each protrusion extending into one of the indentation sections. This ensures the carrier is not rotated over more than 180°, as this could strain the electrical wiring, and create issues with the electronics.

In a preferred embodiment, the hollow channel of the housing comprises a widened channel section with a higher radius than a section of the hollow channel closer to the carrier, wherein the joint comprises a widened joint section at the end of the joint opposite to the ball section, said widened joint section extending radially from the axial section closer to the ball section and being dimensioned to fit in the widened channel section. The biasing element or elements are provided between said widened joint section and said widened channel section for exerting the biasing force.

The biasing force is directed along the longitudinal axis away from the ball section to the axial section, thereby 'retracting' the joint into the housing, making sure the socket is clamped between housing and ball section. The magnitude of this biasing force is preferably limited to allow for smooth rotation between the ball section, the socket and the housing.

The biasing elements may be one or more from any number of components, such as wave springs (crest-to-crest), serpentine springs, washers (for instance Belleville washer) or flat springs, machined springs, garter springs, or flexible, compressible elements, such as elastic rings, or other options. Many of these spring elements are made of, or substantially comprise metal (preferably aluminum or steel), which provide for excellent low-friction interfaces when paired with another metal (again, preferably aluminum or steel) surface, such as that of the axial section of the joint at the widened joint section, or that of a washer between the biasing element and the housing.

Alternatives may be provided, such as the axial section comprising an inwards indentation into which protrusions from the hollow channel may extend, between which protrusions and indentation the biasing elements may be provided for exerting the biasing force.

In a further preferred embodiment, the axial section transitions into the widened joint section via one or more joint walls essentially perpendicular to the longitudinal axis of the axial section, whereby the hollow channel transitions into the widened channel section via one or more channel walls essentially perpendicular to the longitudinal axis of the hollow channel, said one or more channel walls lining up with said one or more joint walls and wherein the biasing elements are provided between said one or more channel walls and said one or more joint walls. By setting up the interfaces between the joint and the housing perpendicular to the longitudinal axis, the force(s) between the two is (are) optimally directed, and the biasing elements are reliably and optimally positioned.

In a variation, the joint walls and the channel walls are not perpendicular to the longitudinal axis. This can assist in ensuring that the joint is centered correctly, thereby further reducing risk of possible friction between the axial section and the housing. Preferably, the joint walls and channel walls are provided in the shape of the mantle of a frustoconus, with the (virtual) apex of the frustoconus being pointed towards the ball section. This embodiment causes the joint's axial section to be centered in the hollow channel due to the pulling force exerted by the socket on the ball section of the joint.

In a further preferred embodiment, the transition of the hollow channel into the widened channel section is stepwise in at least a first and a second step in said order, wherein the first step defines an annular indentation around the axial section in which indentation an O-ring is provided, preferably wherein a washer is provided over the first and second step and between the channel walls and the spring elements.

Providing the O-ring further assists in keeping the joint section centered in the hollow channel of the housing, as well as preventing influx from moisture, dust or dirt from the outside via the mechanical connection, into the housing where the electronic are housed.

In a preferred embodiment, the widened joint section is a separate element fixedly connectable to the axial section of the joint, and whereby said widened joint section and the axial section define an annular groove around the joint section, said annular groove extending into the widened joint section along the longitudinal axis of the axial section, wherein the biasing elements are positioned at least partially in said annular groove. This widened joint section can be attached to the joint via a screw thread connection between the two, but can also be via other attachment systems, such as glue, clamping and/or others. The advantage of using two separate components, is that it allows for an easier construction method (for instance, screwing the axial section of the joint into the widened joint section after the housing has been assembled (i.e., closed). The biasing elements can be incorporated in either the widened joint section or in the housing (at the channel walls or at the joint walls). Additionally, having the widened joint section as a separate element allows for an easier machining process in producing the joint.

The annular groove surrounding the joint section is defined by the widened joint section essentially being provided with a parapet-like structure, between which parapet-like structure and the axial section the annular groove is defined. This annular groove further assists in maintaining the position of the biasing elements, as well as keeping dirt and moisture out of the housing.

In a preferred embodiment, the ball section corresponds to a hemisphere. As mentioned, the hemispherical shell allows for rotation around any axis desired, and furthermore ensures perfect division of force over the surface thereof. Nonetheless, other shapes may be considered, or variations on a hemisphere, with for instance one or more wedges cut out, and/or bores along the longitudinal direction (aside from the wiring channel) or perpendicular thereto (or skewed).

In a preferred embodiment, the joint rotates along with the socket during axial rotation of the socket around the longitudinal axis of the axial section, whereby friction between the joint (or at least the axial section's cylindrical walls) and the housing is substantially non-existent. During said axial rotation around the longitudinal axis, the socket only experiences friction during the axial rotation at the one or more sections of the socket contacting the housing. When undergoing non-axial rotation of the socket around an axis perpendicular to said longitudinal axis, the joint remains substantially fixed with respect to the housing, whereby the socket experiences friction during the non-axial rotation at the one or more sections of the socket contacting the housing and at the one or more sections of the socket contacting the joint, preferably the ball section of the joint. As mentioned, this relative predisposition against non-axial rotation versus axial rotation, is highly advantageous as it maintains pre-established lateral positions for the electronic subsystem, allowing it to be tilted up and down without changing the lateral position.

In a preferred embodiment, the module is rotatably connected to the carrier via a second hinged connection system, said second hinged connection system being according to the first hinged connection system of any of the preceding claims 1 to 9, wherein the joint and the housing is part of the module. The addition of a second hinged connection system provides for a further flexibility of movement for the electronic subsystem. This can be advantageous to for instance show the electronic subsystem to other people than the user. In other embodiments, multiple electronic subsystems can be provided on the module, between which can be chosen by rotating another electronic subsystem to the visible or useful position (for instance different types of electronic subsystems depending on a certain application).

Additionally, enabling non-axial rotation of the electronic subsystem via the second hinged connection systems can allow a user to make very minor and subtle adaptations to the exact position combined with the direction of the electronic subsystem, whereas the non-axial rotation at the first hinged connection system is mainly used in lateral repositioning.

In a further preferred embodiment, the carrier comprises a hollow pathway extending between the cavity of the socket of the first hinged connection system and the cavity of the socket of the second connection system, whereby the electrical wiring extends through said hollow pathway and through the hollow wiring channel of the joint of the second hinged connection system, to the module.

In a preferred embodiment, each of the interior surface section, the exterior surface section, the brace sections and the mantle are axially symmetrical surfaces, wherein the mantle and brace sections are axially symmetrical around the longitudinal axis of the axial section.

In a preferred embodiment, the first hinged connection system, and preferably also the second hinged connection system, is at least partially covered by a deformable resilient means, preferably comprising rubber or an elastomer. This provides for additional protection to the mechanical components as well as avoiding dirt, dust or moisture getting into the housing.

In a preferred embodiment, the device comprises mounting means for, removably, affixing the device to headwear or glasses. Providing the device as a modular component that can be affixed to other types of headwear greatly improves its applications, while making excellent use of the heightened flexibility. By having a (or preferably two) hinged connection system that allows for movement around multiple axis, the position of the electronic subsystem can be adapted for each use, whether the device be fixated centrally at a user's head or laterally, and can easily compensate for minor shifts in design between similar types of headwear (for instance different glasses).

The invention is further described by the following non-limiting examples which further illustrate the invention, and are not intended to, nor should they be interpreted to, limit the scope of the invention.

EXAMPLES

FIGS. 1A-C show a cross-sectional view of a hinged connection system of an HMD according to the invention. The HMD largely comprises a frame (4), a carrier (17) and a display module (18) which comprises an electronic subsystem, in this case a display (19). The carrier (17) is at a first end rotatably connected to the frame (4) via a (first) hinged connection system, and the display module (18) is rotatably connected to the carrier (17) at its other end via a (second) hinged connection system. The carrier (17) has an interior cavity (5) extending between its two ends, allowing wiring to run from the frame (4) to the display module (18).

The hinged connection system's main components are a joint (1), which comprises a ball section (1*b*) and an axial section (1*a*), a socket (2), which is part of a carrier (17 and a housing (3) which is part of or attached to the overall frame (4) of the HMD. The axial section extends along a virtual longitudinal axis (14) and is not limited in its length, either minimally or maximally. The ball section (1*b*) comprises at least part of a spherical surface, in the Figure depicted as an approximate hemisphere, and has a central hollow wiring channel (6) extending through the axial section (1*a*) as well, allowing electric wiring to extending from the housing to the cavity (5) that is present in the socket (2). The socket (2) comprises a cavity (5) and an opening surrounded by an annular section (20) that extends between the exterior of the socket (2) and the cavity (5), and embraces the ball section (1*b*). The ball section (1*b*) effectively seals off the cavity (5) of the socket (2). The axial section (1*a*) of the joint (1) extends into the housing (3) and is housed at least partly in a hollow channel in said housing (3). The hollow channel of the housing (3) transitions, via the channel walls (16) into a widened channel section with a higher radius, where the axial section (1*a*) also radially expands in a widened joint section (10) via the joint walls (15), in this case with the joint and channel walls (15, 16) perpendicular to the longitudinal axis (14). The widened joint section (10) comprises a parapet-like structure (11) creating an annular groove between the structure (11) and the axial section (1*a*). In the version of FIGS. 1A-C, the widened channel section (10) is a separate component attached to the axial section (1*a*) via screw thread, though other options are available of course.

Between the joint and channel walls (15, 16), an O-ring (13), a washer (12) and a biasing element (9) are provided, the first two extending all the way around the axial section, and the latter preferably as well. The channel walls (16) are stepped, with a first step for holding the O-ring (13), with the washer (12) covering both the second step and the first step with the O-ring. The biasing element (9) is held between the washer (12) and the joint wall (15) and is adapted for exerting a biasing force on the joint wall (15), pushing the joint (1) deeper into the housing (3) to ensure that the ball section (1*b*) holds the socket into place against the housing (3), in a way that still allows rotation under sufficient force by a user. The biasing elements (9) are further kept in position by the parapet-like structure (11).

The socket (2) and ball section (1*b*) contact each other (7) with respectively the interior surface section (7*a*) and the ball section mantle (7*b*). The socket (2) and the housing (3) contact each other (8) with respectively the exterior surface section (8*a*) and the brace sections (8*b*). By having the axial section (1*a*) held substantially frictionless in the housing (3), it is ensured that upon rotation of the socket (2) around the longitudinal axis (14), the joint (1) rotates along with the socket (2).

The annular section (20) of the socket (2) is provided with a divergence (increases in aperture) towards the exterior in a frustoconical fashion, allowing the joint (1) to be moved in a non-axial (perpendicular to the longitudinal axis (14)) way, up to a certain amount. The extent of this freedom can be chosen with some freedom by changing the aperture of the (frusto)cone defining the annular section (20).

Figure 3:
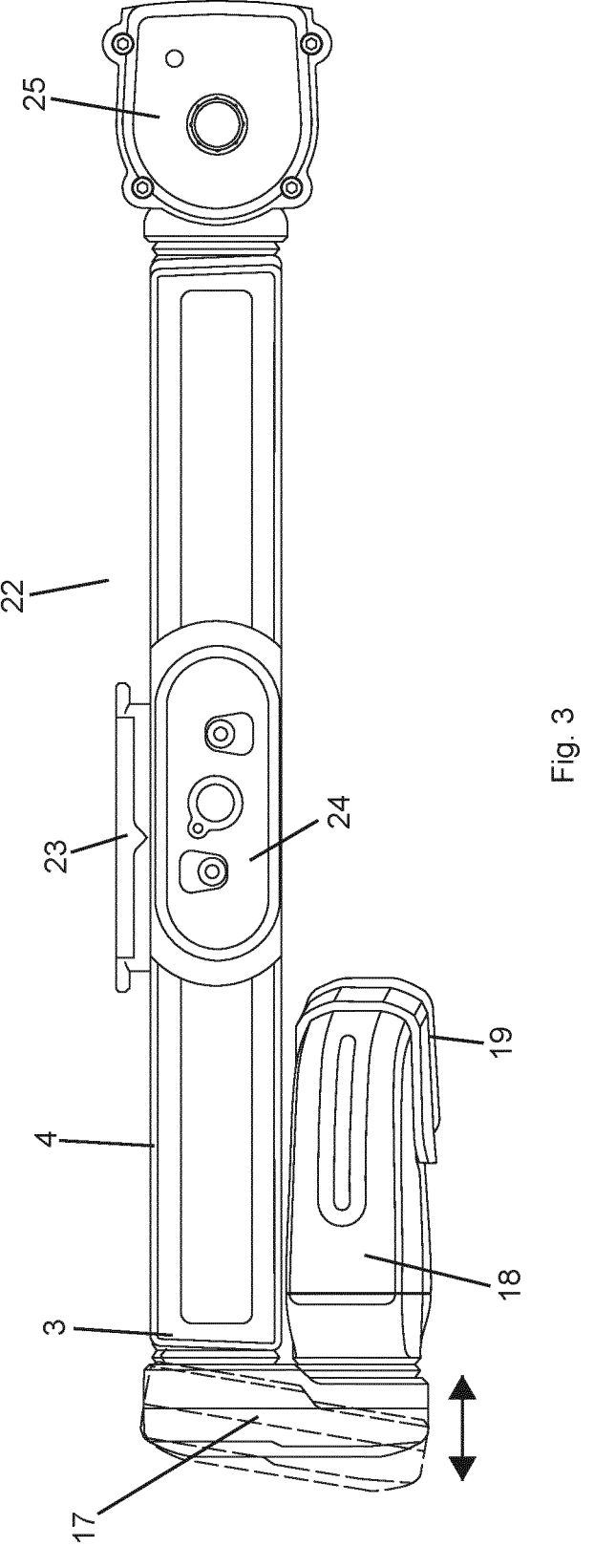
FIG. 3 shows a frontal view of the HMD according to an embodiment of the present invention, showcasing a second possible movement direction.

FIGS. 2 and 3 show perspective views of an embodiment of the HMD (22), which is provided as a longitudinal front frame (4) housing many of the electronic components, such as an imaging system and speaker (24). As can be seen, the frame (4) comprises a mounting means (23) that can be used to attach the HMD (22) to another piece of headwear, such as the brim of a helmet. Other versions are possible as well, such as compact modular version which can be attached laterally to headwear.

The carrier (17) can rotate with respect to the frame (4) around the longitudinal axis, which extends generally along the frame (4), as can be seen in FIG. 2 by the arrow. FIG. 3 showcases the non-axial rotation of the carrier (17) with respect to the housing (3) or frame (4) around an axis perpendicular to the longitudinal axis.

It is supposed that the present invention is not restricted to any form of realization described previously and that some modifications can be added to the presented example of fabrication without reappraisal of the appended claims. For example, the present invention has been described referring to smart glasses or modules for smart glasses in some of the figures, but it is clear that the invention can be applied to any type of headwear, for instance hats, helmets, caps, regular glasses, or others.

The invention claimed is:

1. A head-mounted device (HMD), comprising:
   a. a frame arranged to be wearable on a user's head, said frame comprising one or more electronic components;
   b. a module comprising an electronic subsystem;
   c. a carrier for supporting the module, said carrier being freely rotatably connected to the frame via a first hinged connection system;
   d. electrical wiring connecting the electronic subsystem to the one or more electronic components;
   wherein the first hinged connection system comprises at the frame of the HMD a joint with an elongate axial section and a ball section with a larger diameter than the axial section, wherein the axial section transitions into the ball section along a first direction of the axial section, wherein the ball section comprises an at least partially spherical portion;
   the first hinged connection system further comprising a housing at the frame, said housing comprising an elongate, hollow channel, in which hollow channel at least part of the axial section of the joint is rotatably housed;
   the first hinged connection system further comprising at the carrier a socket with an interior cavity and an opening extending from the interior cavity to the outside of the socket;
   wherein the ball section of the joint is held in the interior cavity of the socket with the axial section extending out of the socket through the opening, whereby the opening has a larger radius than the axial section, thereby allowing a limited, relative rotation between the ball section and the socket around at least one axis in a plane perpendicular to the axial section;
   wherein the socket is positioned at least partially between and in contact with the at least partially spherical portion of the ball section and the housing;
   wherein said joint comprises a hollow wiring channel extending along the length of the axial section and extending via the ball section into the cavity of the socket, whereby the electrical wiring extends from the electronic components through the wiring channel into the cavity and to the electronic subsystem;
   wherein the hinged connection system comprises one or more biasing elements for exerting a biasing force on the joint, said biasing force extending away from the carrier along a longitudinal axis of the axial section, thereby biasing the ball section of the joint against the socket whereby rotation of the carrier around the longitudinal axis of the joint generates a corresponding rotation of the joint along said longitudinal axis;

wherein the module is rotatably connected to the carrier via a second hinged connection system, said second hinged connection system being according to the first hinged connection system, wherein the joint and the housing is part of the module; and, wherein the carrier comprises a hollow pathway extending between the cavity of the socket of the first hinged connection system and the cavity of the socket of the second hinged connection system, whereby the electrical wiring extends through said hollow pathway and through the hollow wiring channel of the joint of the second hinged connection system to the module.

2. The head-mounted device according to claim 1, wherein said socket comprises an annular section around the opening, wherein said annular section comprises an interior surface section inside of the cavity facing partially in the first direction, and wherein said annular section comprises an exterior surface section facing partially in a second direction opposite to the first direction, said exterior surface section defining a mantle of a spherical segment, said interior surface section corresponding to at least part of the mantle of the at least partially spherical portion of the ball section, wherein the housing comprises one or more brace sections with an aggregated surface at least partially matching the exterior surface section, and wherein the socket is positioned at least partially between and in contact with the at least partially spherical portion of the ball section and the brace sections; wherein the ball section biases the socket against the brace sections via the biasing force.

3. The head-mounted device according to claim 2, wherein the brace sections define a surface of a first sphere, and wherein the exterior surface section defines a surface of a second sphere, said first and second sphere essentially overlapping.

4. The head-mounted device according to claim 2, wherein the annular section of the socket extends from the cavity, defining an elongate continuation of the opening, said continuation being essentially frustoconical, wherein the radius of the continuation increases away from the cavity.

5. The head-mounted device according to claim 2, wherein one of the exterior surface section or the brace sections comprises one or more partially annular indentations extending around part of the circumference of the exterior surface section or the brace sections, and wherein the other of the exterior surface section or the brace sections comprises one or more protrusions extending into said partially annular indentations, thereby defining a limit to the axial rotation of the socket with respect to the housing in both directions.

6. The head-mounted device according to claim 2, wherein during axial rotation of the socket around the longitudinal axis of the axial section, the joint rotates along with the socket whereby friction between the joint and the housing is substantially non-existent, and whereby the socket only experiences friction during the axial rotation at the one or more sections of the socket contacting the housing; and wherein during non-axial rotation of the socket around an axis perpendicular to said longitudinal axis, the joint remains substantially fixed with respect to the housing, whereby the socket experiences friction during the non-axial rotation at the one or more sections of the socket contacting the housing and at the one or more sections of the socket contacting the joint.

7. The head-mounted device according to claim 2, wherein each of the interior surface section, the exterior surface section, the brace sections and the mantle are axially symmetrical surfaces, wherein the mantle and brace sections are axially symmetrical around the longitudinal axis of the axial section.

8. The head-mounted device according to claim 1, wherein the hollow channel of the housing comprises a widened channel section with a higher radius than a section of the hollow channel closer to the carrier, wherein the joint comprises a widened joint section at the end of the joint opposite to the ball section, said widened joint section extending radially from the axial section closer to the ball section and being dimensioned to fit in the widened channel section, and wherein the biasing elements are provided between said widened joint section and said widened channel section for exerting the biasing force.

9. The head-mounted device according to claim 8, wherein the axial section transitions into the widened joint section via one or more joint walls essentially perpendicular to the longitudinal axis of the axial section, wherein the hollow channel transitions into the widened channel section via one or more channel walls essentially perpendicular to the longitudinal axis of the hollow channel, said one or more channel walls lining up with said one or more joint walls and wherein the biasing elements are provided between said one or more channel walls and said one or more joint walls.

10. The head-mounted device according to claim 8, wherein the widened joint section is a separate element fixedly connectable to the axial section of the joint, and whereby said widened joint section and the axial section define an annular groove around the joint section, said annular groove extending into the widened joint section along the longitudinal axis of the axial section, wherein the biasing elements are positioned at least partially in said annular groove.

11. The head-mounted device according to claim 1, wherein the ball section corresponds to a hemisphere.

12. The head-mounted device according to claim 1, wherein said first hinged connection system is at least partially covered by a deformable resilient means.

13. The head-mounted device according to claim 1, wherein said device comprises mounting means for removably affixing the device to headwear or glasses.

14. The head-mounted device according to claim 1, wherein the at least partially spherical portion is a spherical segment, a sphere, or a spherical cap.

15. The head-mounted device according to claim 1, wherein there is limited, relative rotation between the ball section and the socket around all axes in the plane perpendicular to the axial section.

16. The head-mounted device according to claim 1, wherein the hollow wiring channel is substantially straight.

17. The head-mounted device according to claim 1, wherein the one or more biasing elements are positioned between the frame and the joint.

18. The head-mounted device according to claim 1, wherein the biasing force is exerted on the axial section of the joint.

* * * * *